(12) United States Patent  
Sasso et al.

(10) Patent No.: US 9,106,674 B2  
(45) Date of Patent: Aug. 11, 2015

(54) INCREASING THE NUMBER OF DOMAIN IDENTIFIERS FOR USE BY A SWITCH IN AN ESTABLISHED FIBRE CHANNEL SWITCHED FABRIC

(75) Inventors: Christian Sasso, Milpitas, CA (US); Siddharth Kasat, Santa Clara, CA (US); Hari Balasubramanian, Oak Park, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 474 days.

(21) Appl. No.: 12/708,451

(22) Filed: Feb. 18, 2010

(65) Prior Publication Data

US 2011/0200330 A1    Aug. 18, 2011

(51) Int. Cl.
   *G06F 15/173*   (2006.01)
   *H04L 29/08*    (2006.01)
   *H04L 12/947*   (2013.01)
   *H04L 12/931*   (2013.01)

(52) U.S. Cl.
   CPC ............ *H04L 67/1097* (2013.01); *H04L 49/25* (2013.01); *H04L 49/357* (2013.01)

(58) Field of Classification Search
   CPC .............................. H04L 49/357; H04L 49/25
   USPC ...................................................... 709/223
   See application file for complete search history.

(56) References Cited

U.S. PATENT DOCUMENTS

| | | | |
|---|---|---|---|
| 7,484,021 B2* | 1/2009 | Rastogi et al. | 710/74 |
| 7,512,123 B1 | 3/2009 | DeSanti et al. | |
| 7,890,654 B1* | 2/2011 | Tadimeti et al. | 709/238 |
| 7,936,769 B2* | 5/2011 | Chung et al. | 370/401 |
| 2004/0148376 A1* | 7/2004 | Rangan et al. | 709/223 |
| 2005/0091353 A1* | 4/2005 | Gopisetty et al. | 709/223 |
| 2005/0169258 A1* | 8/2005 | Millet et al. | 370/389 |
| 2006/0034302 A1* | 2/2006 | Peterson | 370/401 |
| 2006/0168109 A1* | 7/2006 | Warmenhoven et al. | 709/218 |
| 2007/0220124 A1* | 9/2007 | Golasky | 709/223 |
| 2007/0266132 A1* | 11/2007 | Hariharan et al. | 709/223 |
| 2008/0159277 A1 | 7/2008 | Vobbilisetty et al. | |
| 2008/0320143 A1* | 12/2008 | Di Benedetto et al. | 709/226 |

(Continued)

FOREIGN PATENT DOCUMENTS

EP    1 760 937 A2    3/2007

OTHER PUBLICATIONS

"Fibre Channel Switch Fabric-2 (FC-SW-2)," Rev. 5.3, NCITS Working Draft Proposed, American National Standard for Information Technology, Jun. 26, 2001 (208 pages).

(Continued)

*Primary Examiner* — Blake Rubin
(74) *Attorney, Agent, or Firm* — The Law Office of Kirk D. Williams

(57) ABSTRACT

The number of domain identifiers is incrementally increased for use by a switch in an established fiber channel switched fabric. In other words, the number of domains assigned to a switch by the Principal Switch of the fiber channel switched fabric is increased without triggering the reconfiguration of the established fiber channel switched fabric. In one implementation, incrementally adding one or more additional domain identifiers includes requesting said one or more additional domain identifiers from a Principal Switch of the fiber channel switched fabric using a different World Wide Name (WWN) than used to acquire the original one or more domain identifiers used by the switch.

10 Claims, 4 Drawing Sheets

(56) References Cited

U.S. PATENT DOCUMENTS

| | | | |
|---|---|---|---|
| 2009/0024734 A1* | 1/2009 | Merbach et al. | 709/224 |
| 2009/0092141 A1* | 4/2009 | Banerjee | 370/397 |
| 2009/0162058 A1 | 6/2009 | DeSanti et al. | |
| 2009/0245242 A1 | 10/2009 | Carlson et al. | |
| 2010/0040053 A1* | 2/2010 | Gottumukkula et al. | 370/357 |
| 2011/0219183 A1 | 9/2011 | Sasso et al. | |

OTHER PUBLICATIONS

"Cisco N-Port Virtualizer for Large-Scale Fibre Channel Blade Switch Deployments," Cisco Systems, Inc., Jul. 2007 (6 pages).

PCT International Preliminary Report on Patentability for PCT Application PCT/US2011/023941 (which claims priority to U.S. Appl. No. 12/708,451), ISA/EPO, mailed Aug. 30, 2012 seven pages).

Response to Dec. 19, 2013 Office action for European Patent Application No. 11704152.5, Mathys & Squire, London, England, UK filed Apr. 11, 2013 (thirteen pages).

Response to Oct. 10, 2012 Communication for European Patent Application No. 11704152.5, Mathys & Squire, London, England, UK filed Apr. 11, 2013 (thirteen pages).

Office Action for European Patent Application No. 11704152.5 (which claims priority to U.S. Appl. No. 12/708,451), European Patent Office (EPO), Munich, Germany, mailed Dec. 19, 2013 (five pages).

Response to Dec. 19, 2013 Office action for European Patent Application No. 11704152.5, Mathys & Squire, London, England, UK filed Apr. 17, 2014 (eighteen pages).

Intention to Grant European Patent Application No. 11704152.5 (which claims priority to U.S. Appl. No. 12/708,451), European Patent Office (EPO), Munich, Germany, mailed Jul. 4, 2014 (twenty-five pages).

Decision to Grant European Patent Application No. 11704152.5 (which claims priority to U.S. Appl. No. 12/708,451), European Patent Office (EPO), Munich, Germany, mailed Nov. 13, 2014 (two pages).

Office Action (and English translation) for Chinese Patent Application No. 201180010184.4 (which claims priority to U.S. Appl. No. 12/708,451), State Intellectual Property Office of the People's Republic of China, Beijing, China, mailed Jun. 30, 2014 (seventeen pages).

* cited by examiner

INCREASING THE NUMBER OF DOMAIN IDENTIFIERS FOR USE BY A SWITCH IN AN ESTABLISHED FIBRE CHANNEL SWITCHED FABRIC

TECHNICAL FIELD

The present disclosure relates generally to communications systems, such as, but not limited to, those used as part of a storage area network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth), and to use storage area networks (e.g., SANs, VSANs) such as those implemented using Fibre Channel.

Fibre Channel is logically a bidirectional point-to-point serial data channel, structured for high performance. Fibre Channel provides a general transport vehicle for higher-level protocols such as Small Computer System Interface (SCSI) command sets, the High-Performance Parallel Interface (HIPPI) data framing, IP (Internet Protocol), IEEE 802.2, and others. Fibre Channel frames contain 24-bit address identifiers, which identify the frame's source and destination ports, with a domain identifier (Domain_ID) being the highest octet of the address. Each switch in a fibre channel switched fabric is assigned one or more unique domain identifiers using a two-step process. First, one switch, called Principal Switch, is selected from the switches of the fibre channel switched fabric. Then, the Principal Switch assigns the domain identifiers to the other switches of the fibre channel switched fabric. Address assignment within a domain is performed by the switch to which that domain identifier is granted.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
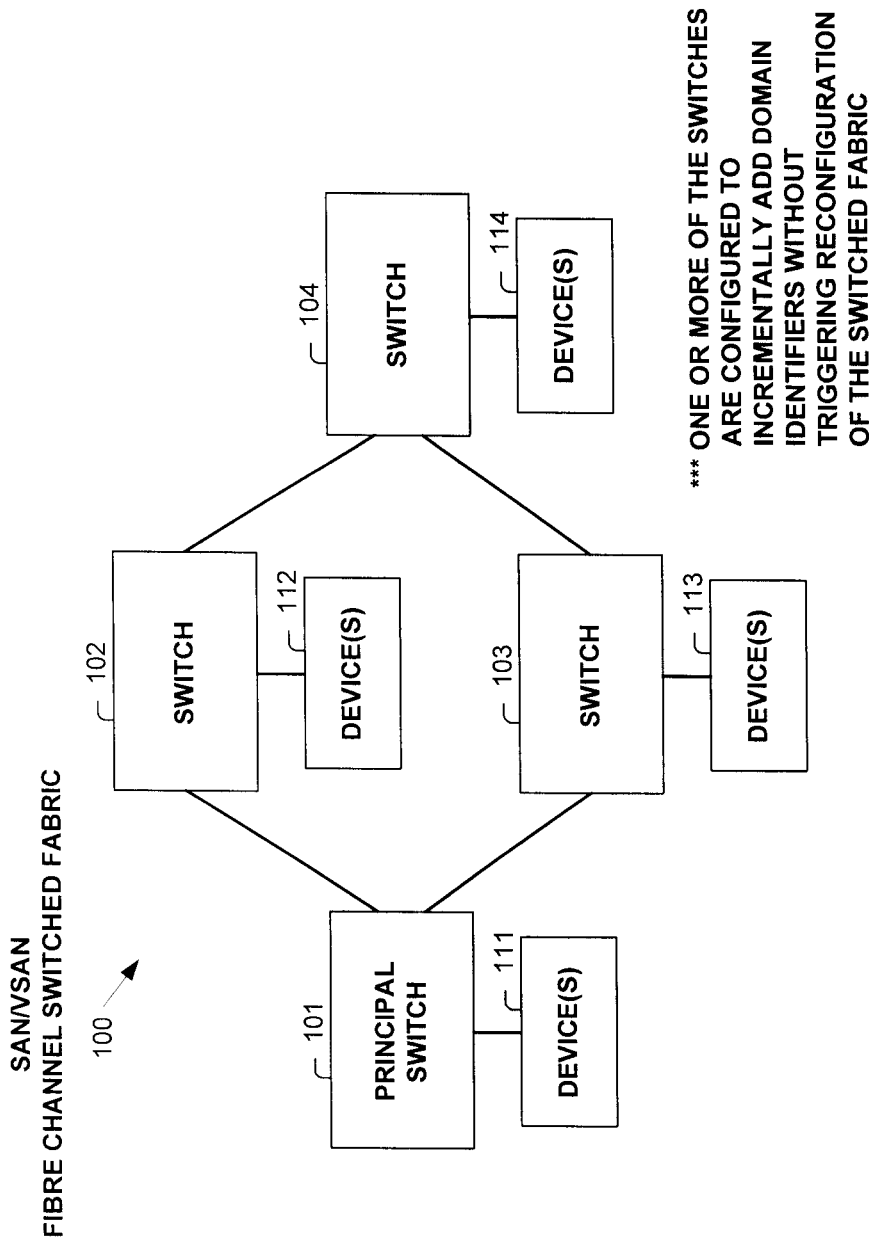
FIG. 1 illustrates a SAN/VSAN fibre channel switched fabric operating according to one embodiment.

Disclosed are, inter alia, methods, apparatus, computer-storage media, mechanisms, and means associated with increasing the number of domain identifiers for use by a switch in an established fibre channel switched fabric. In one embodiment, the number of domains assigned to a switch by the Principal Switch of the fibre channel switched fabric is increased without triggering the reconfiguration of the established fibre channel switched fabric.

One embodiment includes an apparatus, comprising one or more processing elements and memory configured to: establish the apparatus as part of a fibre channel switched fabric, including acquiring one or more domain identifiers for use by the apparatus in a storage area network. Subsequent to said establishment and assignment of said one or more domain identifiers, the apparatus is configured to incrementally add one or more additional domain identifiers for use by the apparatus in the storage area network without triggering reconfiguration of the fibre channel switched fabric. In one embodiment, this incrementally adding one or more additional domain identifiers includes requesting said one or more additional domain identifiers from a Principal Switch of the fibre channel switched fabric using a different World Wide Name (WWN) than used to acquire the original one or more domain identifiers.

2. Description

Disclosed are, inter alia, methods, apparatus, media, mechanisms, and means associated with increasing the number of domain identifiers for use by a switch in an established fibre channel switched fabric. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes an apparatus, comprising: one or more processing elements and memory configured to: establish the apparatus as part of a fibre channel switched fabric, including acquiring one or more domain identifiers for use by the apparatus in a storage area network; and subsequent to said establishment and assignment of said one or more domain identifiers, to incrementally add one or more additional domain identifiers for use by the apparatus in the storage area network without triggering reconfiguration of the fibre channel switched fabric.

In one embodiment, the apparatus is configured to said incrementally add one or more additional domain identifiers subsequent to accessing one or more devices communicatively coupled to the apparatus based on a received request specifying at least one of said one or more domain identifiers. In one embodiment, the apparatus is configured to access at least one device communicatively coupled to the apparatus in response to a received request specifying at least one of said one or more additional domain identifiers. In one embodiment, said incrementally adding one or more additional domain identifiers includes requesting said one or more additional domain identifiers from a Principal Switch of the fibre channel switched fabric using a different World Wide Name (WWN) than used to acquire said one or more domain identifiers. In one embodiment, said incrementally adding one or more additional domain identifiers includes requesting said a plurality of additional domain identifiers from a Principal Switch of the fibre channel switched fabric using a plurality of different World Wide Name (WWN) than used to acquire said one or more domain identifiers.

In one embodiment, the apparatus is configured to access at least one device communicatively coupled to the apparatus in response to a received request specifying at least one of said one or more additional domain identifiers. In one embodiment, said incrementally adding one or more additional domain identifiers includes requesting said one or more additional domain identifiers from a Principal Switch of the fibre channel switched fabric using a different World Wide Name (WWN) than used to acquire said one or more domain identifiers. In one embodiment, said incrementally adding one or more additional domain identifiers includes requesting said a plurality of additional domain identifiers from a Principal Switch of the fibre channel switched fabric using a plurality of different World Wide Name (WWN) than used to acquire said one or more domain identifiers.

One embodiment includes a method, performed by a switch in a fibre channel switched fabric, comprising: establishing the switch as part of the fibre channel switched fabric including receiving, from a Principal Switch of the fibre channel switched fabric, an assignment of one or more domain identifiers for use by the switch; requesting from the Principal Switch of the fibre channel switched fabric, subsequent to said establishment as part of the channel switched fabric, one or more additional domain identifiers in a manner not to trigger reconfiguration of the fibre channel switched fabric; and receiving the assignment of said one or more additional domain identifiers.

One embodiment includes: accessing one or more devices communicatively coupled to the switch in response to a plurality of requests, with each of the plurality of requests specifying at least one of said one or more domain identifiers and said one or more additional domain identifiers.

In one embodiment, one of said one or more domain identifiers and said one or more additional domain identifiers is specified in each of the plurality of requests, such that each of said one or more domain identifiers and said one or more additional domain identifiers is specified by at least one of the plurality of requests. In one embodiment, the switch is associated with a first and a second World Wide Names (WWNs); wherein said operation of establishing the switch as part of the fibre channel switched fabric uses the first WWN such that said one or more domain identifiers are associated with the first WWN; and wherein said operation of requesting said one or more additional domain identifiers specifies the second WWN, which is different than the first WWN. One embodiment includes: accessing a device communicatively coupled to the switch in response to a received request specifying at least one of said one or more domain identifiers; wherein said operation of accessing the device is performed prior to said operation of requesting said one or more additional domain identifiers. In one embodiment, the switch is associated with a first and a second World Wide Names (WWNs); wherein said operation of establishing the switch as part of the fibre channel switched fabric uses the first WWN such that said one or more domain identifiers are associated with the first WWN; and wherein said operation of requesting said one or more additional domain identifiers specifies the second WWN, which is different than the first WWN. In one embodiment, the switch is associated with a first and a second World Wide Names (WWNs); wherein said operation of establishing the switch as part of the fibre channel switched fabric uses the first WWN such that said one or more domain identifiers are associated with the first WWN; and wherein said operation of requesting said one or more additional domain identifiers specifies the second WWN, which is different than the first WWN. In one embodiment, the switch is associated with a first World Wide Name (WWN) and a plurality of other WWNs different than the first WWN; wherein said operation of establishing the switch as part of the fibre channel switched fabric uses the first World Wide Name such that said one or more domain identifiers are associated with the first WWN; and wherein said operation of requesting said one or more additional domain identifiers includes requesting at least one additional domain identifier of said one or more domain identifiers for each of the plurality of other WWNs.

One embodiment includes an apparatus, comprising: means for establishing the apparatus, associated with a first World Wide Name (WWN), as part of a fibre channel switched fabric including being assigned, by a Principal Switch of the fibre channel switched fabric, one or more domain identifiers associated with the first WWN; and means for incrementally being assigned one or more additional domain identifiers by the Principal Switch based on a one or more WWNs, different than the first WWN, also associated with the apparatus without triggering reconfiguration of the fibre channel switched fabric.

One embodiment includes: means for accessing one or more devices communicatively coupled to the apparatus in response to a received request including a specified WWN; wherein the apparatus is configured to incrementally be assigned said one or more additional domain identifiers subsequent to accessing said one or more devices in response to a particular received request specifying the first WWN. One embodiment includes: means for accessing said one or more devices communicatively coupled to the apparatus in response to a received request including a specified particular WWN from a group consisting of said first WWN and said one or more WWNs; wherein the apparatus is configured to incrementally be assigned said one or more additional domain identifiers subsequent to accessing said one or more devices in response to a particular received request specifying the first WWN. One embodiment includes: means for accessing one or more devices communicatively coupled to the apparatus in response to a received request including a specified particular WWN from a group consisting of said first WWN and said one or more WWNs.

Expressly turning to the figures, FIG. 1 illustrates a SAN/VSAN fibre channel switched fabric 100 operating according to one embodiment. As shown, SAN/VSAN fibre channel switched fabric 100 includes four switches 101-104, with respectively attached one or more devices 111-114. Of course, fibre channel switched fabric can have more or less number of switches. One of switches 101-104 is determined to be the Principal Switch, and in this example, switch 101 is determined to be the Principal Switch in SAN/VSAN fibre channel switched fabric 100. Each of switches 101-104 requests from SAN/VSAN fibre channel switched fabric's (100) Principal Switch (switch 101) one or more domain identifiers using their World Wide Name (WWN), and receives these in the conventional manner. In a prior approach, a switch might typically request more domain identifiers than it currently needs to allow for the use of one or more additional domain identifiers; otherwise, to increase its assigned number of domain identifiers, the fibre channel switched fabric would need to be reconfigured (e.g., the SAN/VSAN fibre channel switched fabric formed, a new determination of the Principal Switch, and each switch requesting and being assigned domain identifiers).

In contrast to prior systems, one embodiment, as described herein, provides for incrementally increasing the domain identifiers assigned to a switch (101-104) of a SAN/VSAN fibre channel switched fabric (100) without triggering the reconfiguration of the SAN/VSAN fibre channel switched fabric (100). One embodiment provides for this incremental addition of domain identifier(s) to a switch (101-104) by having the switch (101-104) request one or more domain identifiers using a different World Wide Name (WWN) than used to request its initial domain identifiers. Because the switch (101-104) knows which switch of the SAN/VSAN fibre channel switched fabric (100) is the Principal Switch (101 in the illustrated example), it knows where to send the request. In this manner, Principal Switch 101 operates as normal by assigning the newly requested domain identifiers for the different WWN (and thus probably considering the request coming from a switch different than one that has already been assigned one or more domain identifiers).

Figure 2:
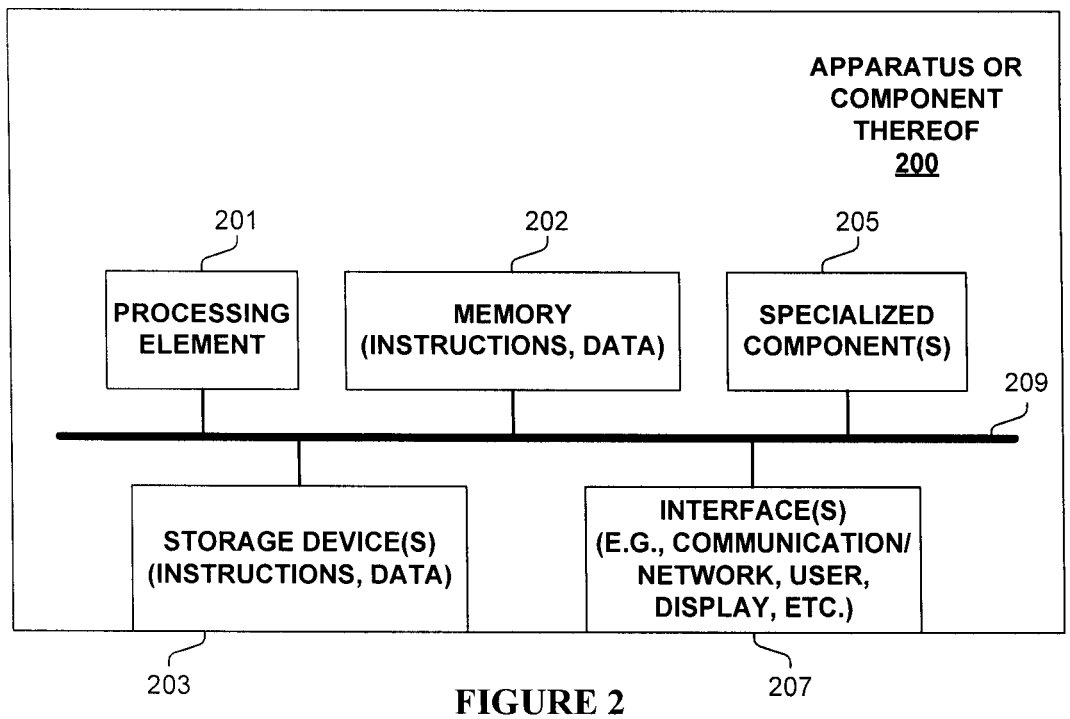
FIG. 2 illustrates an example apparatus or component used in one embodiment.

FIG. 2 is block diagram of an apparatus (e.g., switch) or component 200 used in one embodiment associated with increasing the number of domain identifiers for use by a switch in an established fibre channel switched fabric. In one embodiment, apparatus or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, one or more of switches 101-104 of FIG. 1.

Various embodiments of apparatus or component 200 may include more or less elements. The operation of apparatus or component 200 is typically controlled by processing element(s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
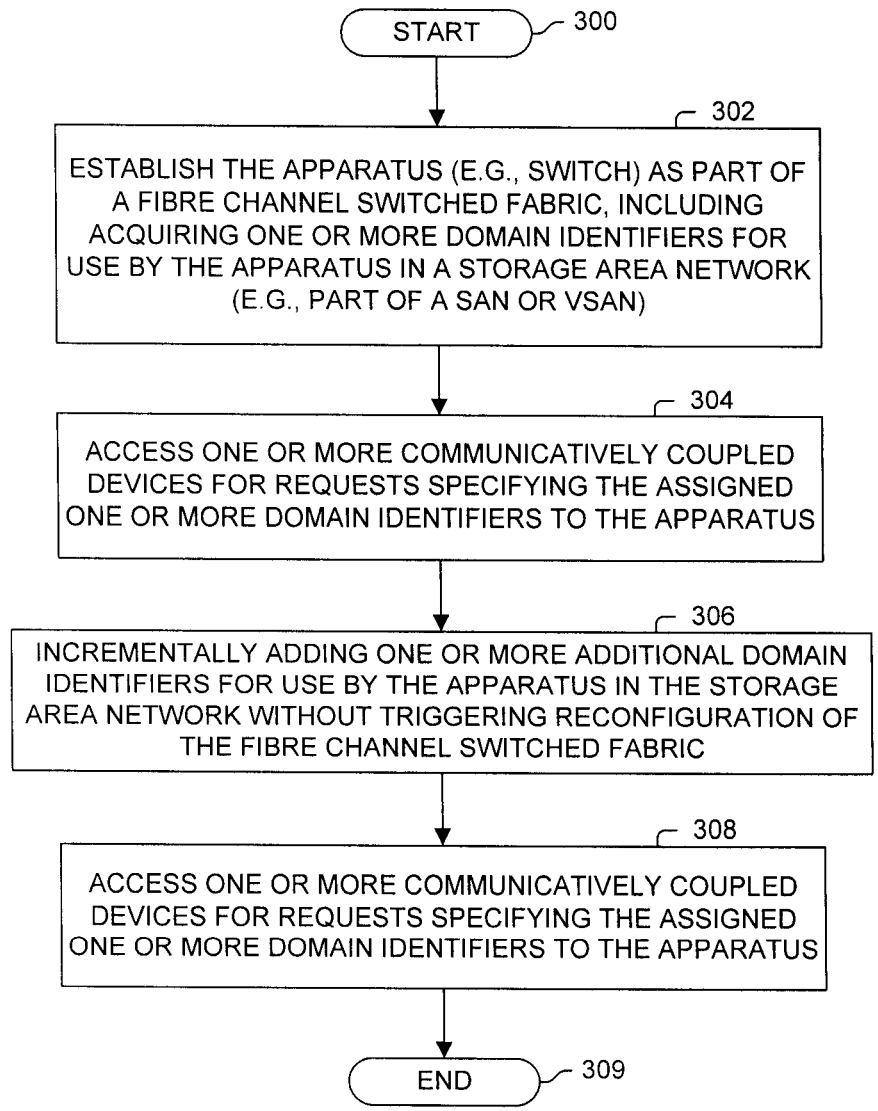
FIG. 3 illustrates a process performed in one embodiment.

FIG. 3 illustrates a process performed in one embodiment. Processing begins with process block 300. In process block 302, the apparatus (e.g. switch) is established as part of a fibre channel switch fabric, which includes acquiring (requesting and being assigned by the fibre channel switch fabric's Principal Switch) one or more domain identifiers for use by the apparatus in a storage area network (e.g., SAN or VSAN). In process block 304, received requests specifying one of the apparatus' assigned domain identifiers are processed, which typically includes accessing one or more communicatively coupled devices. In other words, the apparatus is functioning and process block 306 is performed at some time thereafter, and not simply as part of the initial establishment of the fibre channel switched network. In process block 306, the apparatus incrementally adds one or more additional domain identifiers for use by the apparatus in the storage area network without triggering reconfiguration of the fibre channel switched network. In process block 308, received requests specifying one of the apparatus' initially or incrementally assigned domain identifiers are processed, which typically includes accessing one or more communicatively coupled devices. In other words, the initial and incrementally assigned domain identifiers are used within the storage area network for accessing data. As illustrated by process block 309, the processing of the flow diagram of FIG. 3 is complete.

Figure 4:
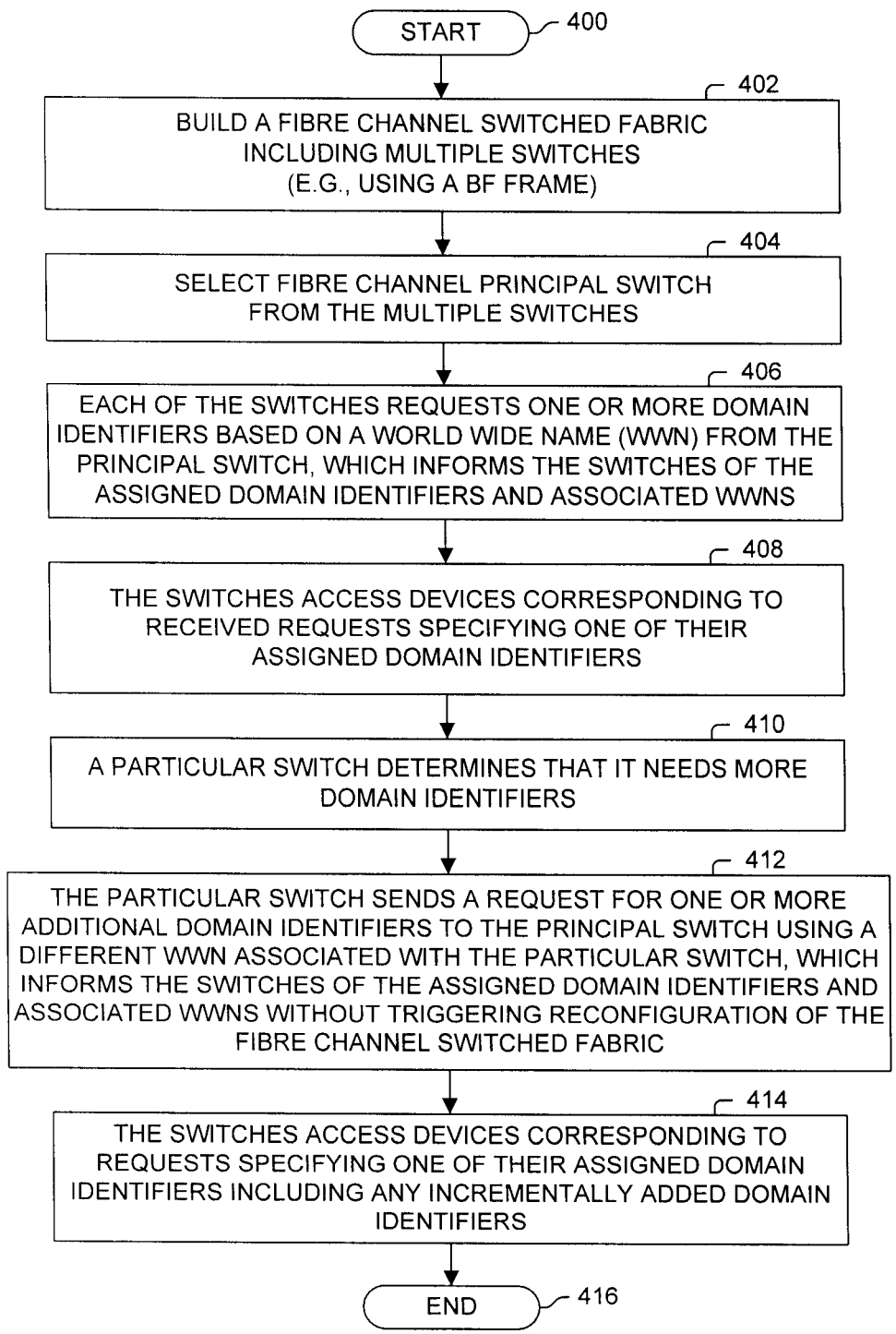
FIG. 4 illustrates a process performed in one embodiment.

FIG. 4 illustrates a process performed in one embodiment. Processing begins with process block 400. In process blocks 402-406, the apparatus (e.g. switch) is established as part of a fibre channel switch fabric. More specifically, in process block 402, the fibre channel switched fabric is build (e.g., using a build fabric (BF) frame). In process block 404, one of the switches is selected as the Principal Switch. In process block 406, each of the switches of the fibre channel switched network requests, from the Principal Switch, one or more domain identifiers based on a World Wide Name (WWN), and the Principal Switch informs the switches of the assigned domain identifiers and associated WWNs. In process block 408, the switches access devices corresponding to requests specifying one of their assigned domain identifiers. In other words, the SAN/VSAN is established and functioning.

Subsequently, in process block 410, a particular switch determines that it needs one or more additional domain identifiers. In process block 412, the particular switch sends a request for one or more additional domain identifiers to the Principal Switch using a different WWN associated with the particular switch. The Principal Switch assigns the additional domain identifiers and informs the switches of the assigned domain identifiers and associated WWNs. This incremental assignment of domain identifiers to the particular switch is performed without triggering the reconfiguration of the fibre channel switched fabric. In process block 414, the switches access devices corresponding to requests specifying one of their assigned domain identifiers, including any incrementally assigned domain identifiers. In other words, the SAN/VSAN is established and functioning using both initially and incrementally assigned domain identifiers.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A fibre channel switched fabric switch, comprising:
one or more processing elements and memory configured to establish the fibre channel switched fabric switch as part of a fibre channel switched fabric, including:
requesting from a Principal Switch of the fibre channel switched fabric, one or more domain identifiers using a World Wide Name (WWN) of the fibre channel switched fabric switch, and
acquiring from the Principal Switch the one or more domain identifiers which the fibre channel switched fabric switch is configured to use in a storage area network in reacting to a received storage request specifying one or more of said acquired domain identifiers; and
subsequent to said establishing as part of a fibre channel switched network and said acquiring of said one or more domain identifiers, to incrementally add one or more additional domain identifiers by:
requesting from the Principal. Switch of the fibre channel switched fabric, one or more additional domain identifiers using one or more different WWNs than the WWN used to request the one or more domain identifiers, wherein reconfiguration of the fibre channel switched fabric is not triggered, and
acquiring from the Principal Switch the one or more additional domain identifiers;
wherein the fibre channel switched fabric switch is configured to use the one or more additional domain identifiers in addition to said previously acquired domain identifiers in the storage area network in reacting to a received storage request, including reacting to a received storage request specifying one or more of said acquired additional domain identifiers;
wherein said reacting to a particular received storage request includes accessing one or more storage devices, directly coupled to the fibre channel switched fabric switch, corresponding to said previously acquired domain identifier specified in the particular received storage request or said acquired additional domain identifier specified in the particular received storage request.

2. The fibre channel switched fabric switch of claim 1, wherein the fibre channel switched fabric switch is configured to said incrementally add one or more additional domain identifiers subsequent to accessing one or more devices communicatively coupled to the fibre channel switched fabric switch based on a received request specifying at least one of said one or more additional domain identifiers.

3. The fibre channel switched fabric switch of claim 2, wherein the fibre channel switched fabric switch is configured to access at least one device communicatively coupled to the fibre channel switched fabric switch in response to a received request specifying at least one of said one or more additional domain identifiers.

4. The fibre channel switched fabric switch of claim 1, wherein said incrementally adding one or more additional domain identifiers includes requesting said one or more additional domain identifiers from the Principal Switch of the fibre channel switched fabric using a plurality of different World Wide Names (WWNs) than used to acquire said one or more domain identifiers.

5. A method, performed by a switch in a fibre channel switched fabric, comprising:
establishing the switch as part of the fibre channel switched fabric by: requesting from a Principal Switch of the fibre channel switched fabric, one or more domain identifiers using a World Wide Name (WWN) of the fibre channel switched fabric switch; and receiving, from the Principal Switch of the fibre channel switched fabric, an assignment of one or more domain identifiers for use by the switch;
receiving a storage request specifying at least one of said assigned domain identifiers;
reacting to said received storage request including accessing one or more storage devices, directly coupled to the switch, corresponding to said specified at least one of said assigned domain identifiers;
requesting from the Principal Switch of the fibre channel switched fabric, subsequent to said establishment as part of the channel switched fabric, one or more additional domain identifiers using one or more different WWNs than the WWN used to request the one or more domain identifiers, wherein reconfiguration of the fibre channel switched fabric is not triggered;
receiving from the Principal Switch an assignment of said one or more additional domain identifiers;
receiving another storage request specifying at least one of said assigned additional domain identifiers; and
reacting to said another storage request including accessing one or more storage devices, directly coupled to the switch, corresponding to said specified at least one of said assigned additional domain identifiers.

6. The method of claim 5, comprising: accessing one or more devices communicatively coupled to the switch in response to a plurality of requests, with each of the plurality of requests specifying at least one of said one or more domain identifiers and said one or more additional domain identifiers.

7. The method of claim 6, wherein one of said one or more domain identifiers and said one or more additional domain identifiers is specified in each of the plurality of requests, such that each of said one or more domain identifiers and said one or more additional domain identifiers is specified by at least one of the plurality of requests.

8. The method of claim 5, including: accessing a device communicatively coupled to the switch in response to a received request specifying at least one of said one or more domain identifiers; wherein said operation of accessing the device is performed prior to said operation of requesting said one or more additional domain identifiers.

9. The method of claim 8, wherein the switch is associated with a first and a second World Wide Names (WWNs);
wherein said operation of establishing the switch as part of the fibre channel switched fabric uses the first WWN such that said one or more domain identifiers are associated with the first WWN; and
wherein said operation of requesting said one or more additional domain identifiers specifies the second WWN, which is different than the first WWN or wherein the switch is associated with a first WWN and a plurality of other WWNs different than the first WWN;
wherein said operation of establishing the switch as part of the fibre channel switched fabric uses the first WWN such that said one or more domain identifiers are associated with the first WWN; and
wherein said operation of requesting said one or more additional domain identifiers includes requesting at least one additional domain identifier of said one or more domain identifiers for each of the plurality of other WWNs.

10. The method of claim 5, wherein said receiving the first storage request and said reacting to said received first storage request occurs prior to said requesting from the Principal Switch said or more additional domain identifiers.

* * * * *